(12) United States Patent
Delic et al.

(10) Patent No.: US 7,945,567 B2
(45) Date of Patent: May 17, 2011

(54) STORING AND/OR RETRIEVING A DOCUMENT WITHIN A KNOWLEDGE BASE OR DOCUMENT REPOSITORY

(75) Inventors: Kemal Delic, Grenoble (FR); Laurent Douillet, St Martin de le Cluze (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1561 days.

(21) Appl. No.: 10/388,601

(22) Filed: Mar. 17, 2003

(65) Prior Publication Data

US 2004/0186824 A1 Sep. 23, 2004

(51) Int. Cl.
*G06F 17/00* (2006.01)

(52) U.S. Cl. ........ 707/728; 707/711; 707/731; 707/770; 707/791

(58) Field of Classification Search .................. 707/3–5, 707/1, 100, 711, 728, 731, 770, 791
See application file for complete search history.

(56) References Cited

U.S. PATENT DOCUMENTS

| | | | |
|---|---|---|---|
| 5,895,470 A | | 4/1999 | Pirolli et al. .................. 707/102 |
| 5,924,090 A | * | 7/1999 | Krellenstein .................... 707/5 |
| 6,199,067 B1 | * | 3/2001 | Geller ............................ 707/10 |
| 6,778,979 B2 | * | 8/2004 | Grefenstette et al. ............. 707/3 |
| 6,804,688 B2 | * | 10/2004 | Kobayashi et al. ........... 707/203 |

OTHER PUBLICATIONS

Nuyts, "EPOQUE Search and Viewer tools at the European Patent Office", Proceedings of the 2000 Chemical Information Conference (XP009003259), pp. 47-56.
Delic et al., "Knowledge Harvesting, Articulation, and Delivery", The Hewlett-Packard Journal, May 1998, pp. 74-81.
Delic et al., "Knowledge-Based Support Services: Monitoring and Adaptation", IEEE, 2000, pp. 1097-1101.

* cited by examiner

*Primary Examiner* — Sana Al-Hashemi

(57) ABSTRACT

A document is stored in and retrieved from a repository being indexed by a search engine by applying to each document a first classification based on a profile of a user who is likely to access the repository. A query formulated by the user to the search engine results in the engine producing a list of references of documents. The list of references is reduced by eliminating from the lists the documents and references which do not correspond to the user's profile. A second classification level, representative of the particular nature of the problem to which the document refers, is performed. Automatic tagging and labeling mechanisms improve the repository partitioning.

13 Claims, 5 Drawing Sheets

STORING AND/OR RETRIEVING A DOCUMENT WITHIN A KNOWLEDGE BASE OR DOCUMENT REPOSITORY

RELATED APPLICATIONS

The present application is based on, and claims priority from, European Application Number 02354046.1, filed Mar. 14, 2002, the disclosure of which is hereby incorporated by reference herein in its entirety.

TECHNICAL FIELD OF THE INVENTION

The invention relates to information retrieval (IR) techniques and more particularly to processes, and related computer programs and systems, for storing and/or retrieving a document within a knowledge base or repository.

BACKGROUND ART

The progress of information technology (IT) and the development of computer systems has resulted in the creation of very large knowledge bases containing thousands of documents and electronic files. Computers collect, store, sort and quickly retrieve references to documents contained within such repositories. The exploitation of such repositories has commonly been based on the use of indexing techniques that allow keyword-based searches for the retrieval of the documents upon request. By formulating a query based on a given set of keywords, a search engine generally provides a ranked output list of documents.

IR techniques have been employed in a wide variety of situations where a user needs precise and quick access to reference documents. One example of such a situation is help-desk (e.g., information booths) or hotline services which are organised for providing quick and effective technical support to customers of computer and other products. Indeed, the daily work of help-desk analysts providing such services is often supported by sophisticated IT systems containing tens of thousands of problem solving documents for all aspects of the products concerned. Upon a problem being raised by a customer, a help-desk analyst examines the problem and provides a quick solution meeting the particular concern of the customer. To achieve this, the help-desk analyst often abstracts the problem into a few keywords. However, IR techniques based on key word searches usually return, by far, too many documents and only a few of the listed documents turn out to be of any real use to the help-desk analysts, a factor that what inevitably jeopardises the effectiveness of the services which are rendered to the customer. In most cases, first line agents of the help-desk services have very little time for finding an effective and practical solution to a single customer's problem, and the use of the traditional techniques based on keyword searches provides too much noise and returns too many documents to be easily exploited by the first level help-desk staff.

Moreover, the handling of the references and documents that are retrieved by the traditional keyword-based search techniques requires professional skill and wide experience from technicians to recognise, among the number of references being cited, a particular document which would be useful for solving the customer's problem. The need for such experience and professional skill is a further difficulty for developing help-desk services which are notorious for being subject to large staff turn-over.

Therefore, it can be seen that in the area of help-desk services, there is a particular need for improving searching techniques to enhance the relevance of the documents and references retrieved from a document repository.

However, whilst the techniques to be described below are particularly suited to this area, they nevertheless address the general problem to improve access to the document collection stored in a database. Therefore application of the techniques in other areas is not excluded.

Finally, because there is an increasing number of situations where document repositories need to be continuously updated, it is highly desirable that the repository update that is performed by introducing additional documents be automatically processed without the need of any manual intervention nor human inspection of the documents.

SUMMARY OF THE INVENTION

It is an object of the present invention to provide a new and improved method of and apparatus for retrieving information.

In general terms, this object is achieved by a process of storing and retrieving a document in a repository that is indexed by a search engine, said process comprising the steps of:

applying to each document a first classification based on the profile of a user who is likely to access the repository;

applying a query formulated by said user to said search engine;

producing a list of references of documents by said search engine in response to the query; and reducing said list of references by eliminating from said list those references which do not correspond to the user's profile.

Preferably, the repository is a repository of problem solving documents and includes a second classification level which is representative of the particular nature of the problem to which the document refers. The second classification level permits effective partitioning of the repository to improve the relevance of cited references in a retrieval process.

In one embodiment, the first classification level is based on counting the number of words, the number of lines and the number of operating steps. In response to the count, a determination is made, as to whether the document comprises an immediate prescription for solving the problem, in which case a first category (FIX) is assigned to the document.

In one particularly preferred embodiment, the first classification level is also based on a comparison of the words included in the document with words extracted from a dictionary. The number of concepts addressed by the documents is determined in response to the comparison.

Preferably, the first classification level results in a 3-tag labeling, comprising:

a FIX tag assigned to the document describing immediate action to be taken by the user;

a STEPNOTE tag assigned to the document determined as having a short sequence of operating steps for solving a problem; and a TECHNOTE tag assigned to a document having a background technical description of a problem.

The first classification level can be complemented by a second classification level which improves the partitioning of the repository of documents. The second classification level is based on the definition of K predetermined classes, each class being defined by a set of n keywords.

In one preferred embodiment, each document is assigned at least one class by an automatic process including the steps of:

applying for each class a query based on a set of keywords extracted from a class definition file, said query being applied to said search engine;

producing a number of K lists of results, each list corresponding to one given class;

comparing for each document of said repository a ranking received in said K lists; and determining a list among said K lists in which said document receives the highest ranking and correspondingly assigning the class corresponding to said particular list as the first class.

Preferably, each document is also assigned a second and a third class as a result of the comparison.

The invention is particularly adapted to the arrangement of a help-desk service, such as those known in the software and computing area, providing a well profiled list of references and documents for different staff, such as first level agents, technicians and experts.

The combination of the keyword search with the contextual analysis of the output list results in a reduction of the list of irrelevant documents retrieved from the search process, and greatly improves the ranking of the relevant documents since the most relevant ones are located closer to the top of the list of output references.

Other aspects of the invention provide associated separate methods of storing in and retrieving documents from the repository and computer program products comprising program code elements and computer systems for carrying out the above-described methods.

BRIEF DESCRIPTION OF THE DRAWINGS

An embodiment of the invention will now be described, by the way of example only, with reference to the accompanying drawings, wherein.

DETAILED DESCRIPTION OF THE DRAWING

Figure 1:
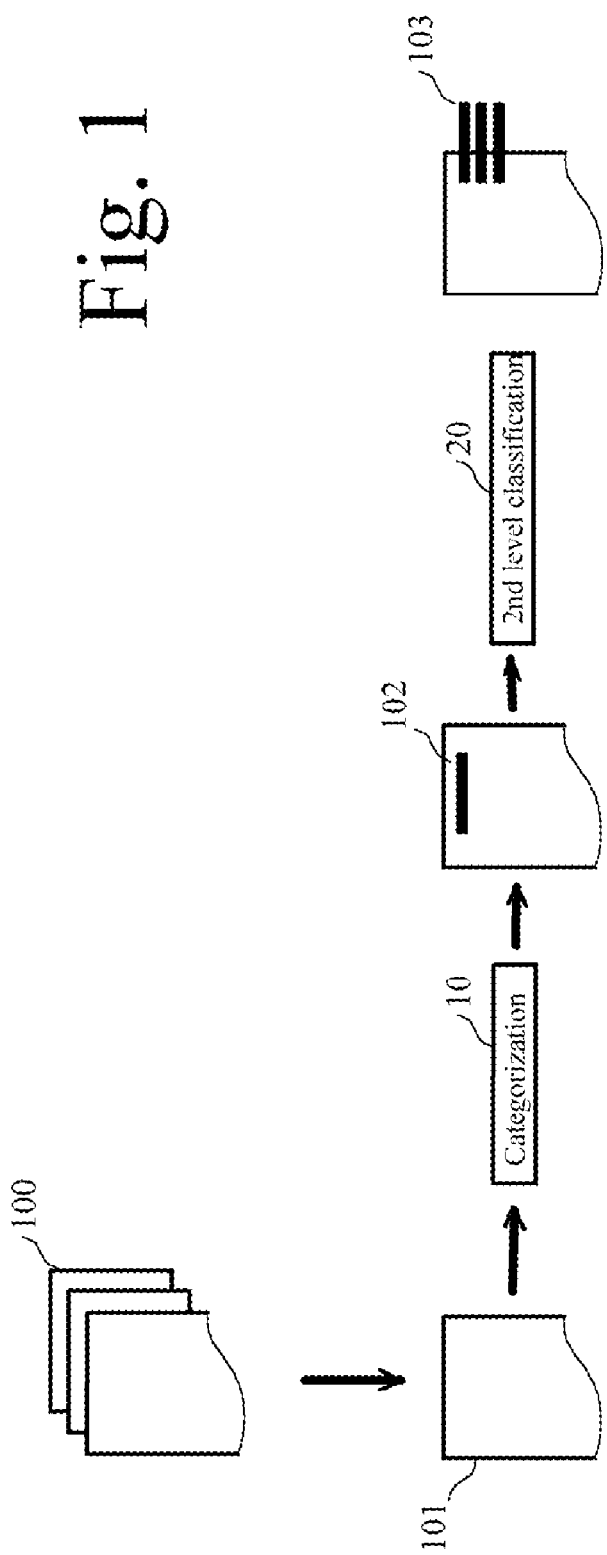
FIGS. 1 and 2 are schematic drawings of the two levels of organization of a repository of documents.

There is now described in detail how an Information Retrieval (IR) process can be arranged which permits quick and effective retrieval of references and documents gathered within a repository of documents. While the process can be used with any kind of document repository or any type of knowledge base, the preferred embodiment is particularly described with reference to the arrangement of a repository of problem solving documents which are drafted to provide guidance, and immediate remedial action, to problems arising in the use of computers, including hardware and software problems. As will be understood from the following description, the processes described are particularly suited for the design of a help-desk tool which is used by help-desk staff and analysts for providing quick and effective solutions to help-desk customers.

The IR process described herein is based on the use of a repository of documents which are indexed using a conventional index creating engine, but enriched with the incorporation of contextual labels or tags automatically computed and applied to the different documents contained within the repository.

Each document incorporated within the repository is classified in accordance with two classification levels. A first classification level is directed to the way the document or reference will be used and the role of the user that will access the reference from the repository. This first classification level permits the documents and references providing direct guidance and operating instructions for a direct solution to a given problem to be distinguished from, for instance, documents which only provide general knowledge and background information relating to a given problem. The latter type of documents generally require deeper insight and reflection on the part of the user accessing the repository and are identified as such by the information retrieval process.

In the preferred embodiment, three different categories are defined: FIX representing documents providing direct and immediate solutions such as those provided by the different wizards which are available in the WINDOWS™ operating systems; STEP NOTE which is a label/tag assigned to documents which provide step-by-step direct solutions to particular problems. The last category is TECH NOTE which is applied to documents providing background relating to a problem, perhaps including drawings, and which require deeper insight from the reader.

In addition to the first classification level, i.e., the categorization mentioned above, the preferred embodiment employs a second classification level which is automatically applied to the knowledge base and which is directed to the particular context of the document. The second classification level concerns the domain to which the particular problem pertains and permits partitioning of the whole knowledge base into a set of n predetermined imposed classes. In the example of a help-desk tool for computer systems, the classes could, for instance, be "Install", "boot", "login/connection", etc. . . . and followed by a "general" class.

The two levels of classification which are performed are illustrated in FIG. 1. A repository of documents 100 is arranged on the basis of a first category tag or label, and three different class tags or labels. Repository 100 is automatically analysed by the computer process to be described in detail hereinafter, and each individual document, such as document 101, is subjected to a categorization step 10 which provides a first label/tag defining one of the categories 102 (FIX, STEP-NOTE, TECHNOTE) which is assigned to the particular document. A further classification step, represented by a step 20 in FIG. 1, provides a second classification level based on the assignment of three distinct ordered classes 103 from a set of n different classes.

Figure 2:
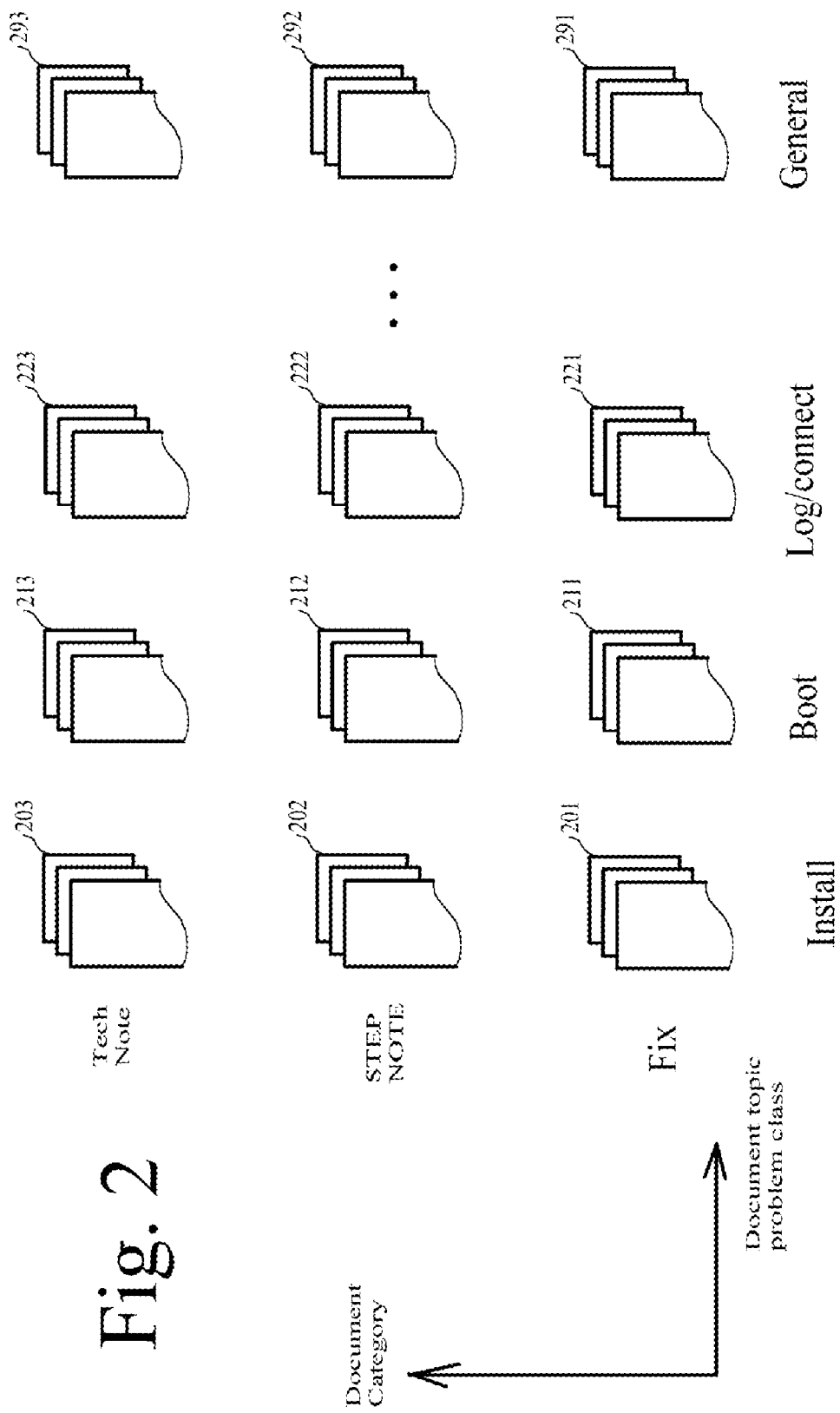

By introducing document categories, such as categories FIX, STEPNOTE and TECHNOTE, and problem class labels, such as classes "install", "boot", "login/connect", and general etc. . . . , such as illustrated in FIG. 2, a precise partitioning of the repository of documents is achieved. More particularly, the FIX category label permits the gathering of documents belonging to a first class 201 (Install), to a second class 211 (Boot), to a third class 221 (login/connect), etc. . . . up to a nth class 291 (general). Similarly, the STEP NOTE category permits the gathering of documents of the first class 202, to the second class 212, to the third class 222, to class 292 etc. . . . The TECH NOTE category permits the gathering of documents belonging to classes 203, 213, 223, . . . 293 etc. . . .

The process which is hereafter described provides for automatic classification, in the two different levels categories and classes, for any new document which is incorporated within the repository. While each document is assigned one and only one category, it can however receive up to three classes including, in some cases, no class at all. The dual organization is particularly effective if the document repository is subject to a contextual searching process to drastically reduce the number of documents and references retrieved by a search engine. In one embodiment, each document is assigned a category that is representative of the amount of technical information contained within the document and the level of technical knowledge required from the potential reader and how immediately the reader can derive a practical solution from the document.

The categorization of each document is based on an automatic mechanism wherein a single tag or label is assigned from among the three different tags available: a first FIX tag, a second STEPNOTE tag and a third TECHNOTE tag.

More particularly, the first, so-called, FIX tag designates a document having an immediate possibility of action from the user or the potential reader of the document. One example of such an immediate action is to launch a particular program or software, such as for instance, a wizard interface, similar to those known from the Windows 98 operating system marketed by Microsoft Corp.

The second so-called STEPNOTE tag designates a document which is expected to solve the problem faced by the customer by using a short sequence of steps. Basically, the STEPNOTE tag is assigned when the document describes a very limited course of action or procedure which the user can carry out relatively quickly.

Finally, the third so-called TECHNOTE tag is assigned to a document containing a relatively lengthy technical description, including, for instance, background information which the reader would have to read and understand in order to gain insight into the problem concerned. Typically, this kind of document might include a set of drawings and require a relatively long time to read and understand.

Figure 3:
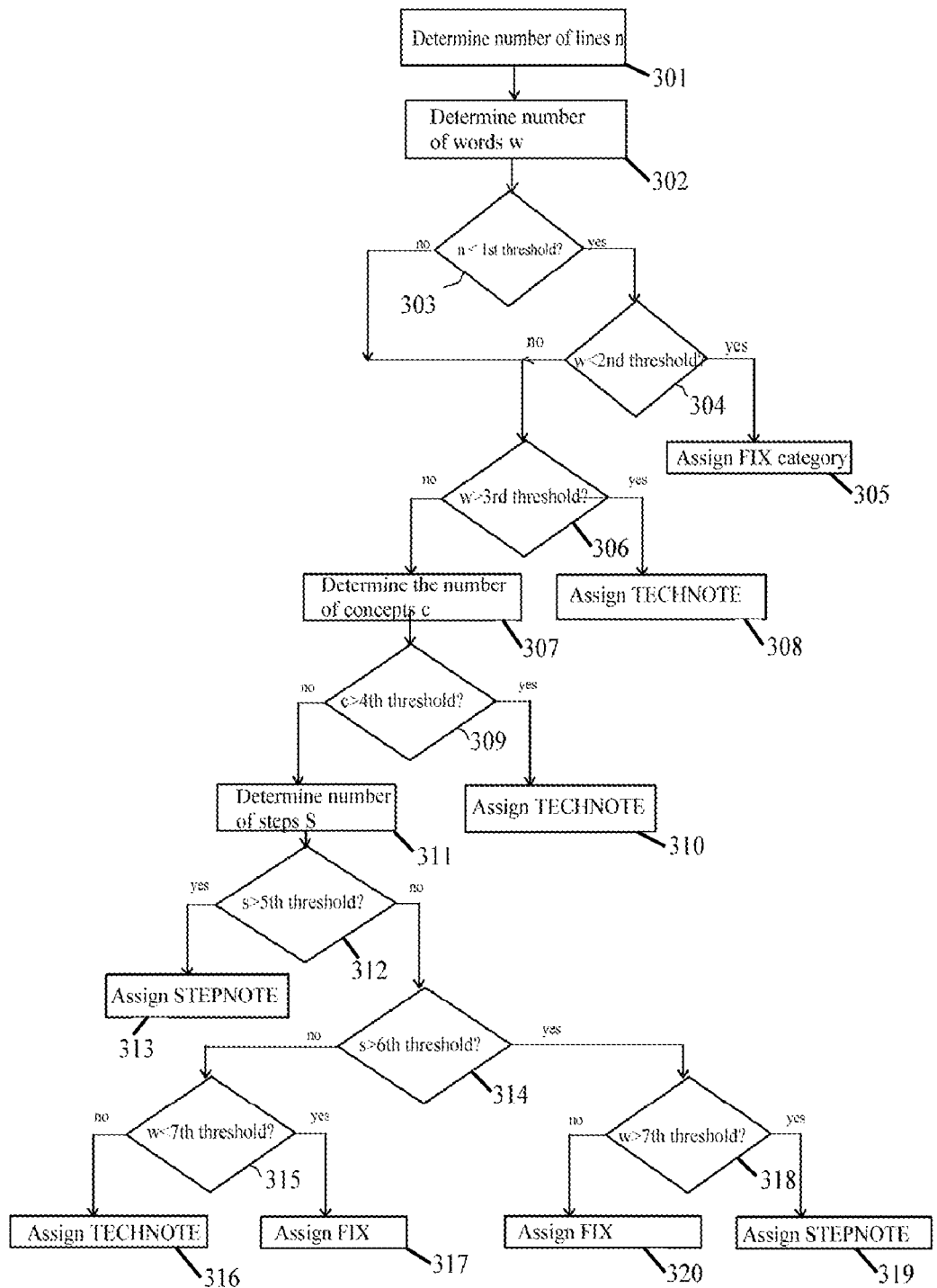
FIG. 3 is a flow chart of operations a computer system performs to obtain a first level of classification involving the categorization of the documents stored within a repository.

FIG. 3 is a flow diagram of a program, a computer system executes to automatically assign the above mentioned tags. In the preferred embodiment, the program, i.e., process, is such as to enable the computer to analyze a wide number of different documents, including the .pdf format used by the ADOBE ACROBAT™ products, the .doc format used by MICROSOFT WORD™, text files, Hyper-Text Mark-up Language (HTML) files, extended Mark-up Language (XML) files etc. . . . It will be understood that the process can be easily adapted to the processing of any other suitable files for which the format is known. The process can even involve Optical Character Recognition techniques to produce a set of ASCII characters from a scanned image file representative of the document being processed.

The process starts with step 301 during which the computer system determines the number of lines n of the considered document.

In step 302, the computer system determines the number of words, w, of the document.

In a step 303, the computer system compares the number of lines, n, to a first threshold which, e.g., is set to be equal to 50. This first threshold sets a minimum number of the lines.

If the number of lines n is greater than the first threshold, then the computer system proceeds to step 304 during which the system compares the number of words, w, to a second threshold used for defining a minimum number of words. In the example, the second threshold is set to 250. If the number of the words is lower than 250, the computer system process proceeds to step 305 during which the category of the document is set to FIX.

If both the tests of steps 303 and 304 fail, the process proceeds to step 306 during which the computer system compares the number of words, w, of the document to a third threshold defining a maximum number of words which is, e.g., set to 700 words.

If the comparison step 306 succeeds then the process goes to step 308, during which the computer system categorizes the document as being a TECHNOTE.

If, on the contrary, the number of words w of the document is lower than the third threshold, then the process proceeds to a step 307 during which the computer system compares the number of concepts c being addressed by the document. The number of concepts is determined with reference to a dictionary the computer system stores. The dictionary includes a particular set of words referring to aspects identified as corresponding to important aspects of a problem. The computer system typically uses some known statistical and empirical heuristics, based on the number of occurrences of such words, to determine whether the concept corresponding to the concerned words is effectively perceived within the document.

In step 309, the computer system process compares the computed value, c, with a fourth threshold, for instance a number equal to 5. If the test succeeds, the process proceeds to step 310 during which the computer system assigns the document to category TECHNOTE.

Conversely, if the number of concepts is lower than the fourth threshold, then the process proceeds to step 311 during which the computer system computes the number of steps S involved in the corresponding document. The computer system determines the number of steps by analyzing (1) keywords, such as "step n", "action", and (2) patterns such as "1/", "2)", "III.", etc . . . There are many suitable techniques that can be used for determining the number of steps to which a process refers.

The process then advances to step 312 during which the computer system compares the number of steps S described in the document to a fifth threshold, for instance 6.

If the test of step 312 reveals that the number of steps S is higher than the fifth threshold, then the process proceeds to step 313, categorizing the document as a STEPNOTE document.

If the test of step 312 indicates the number of steps S is lower than the fifth threshold, the computer system, during step 314, compares the same number, S, to a sixth threshold that is lower than the fifth threshold. A typical value of the sixth threshold value is two. If S is lower than the sixth threshold, then the process proceeds to step 315 during which the computer system compares the number of words, w, of the document with a seventh threshold. If the number w is lower than the seventh threshold, then the process proceeds to step 317 during which the computer system categorizes the document as FIX. Conversely, the process proceeds from step 315 to step 316, during which the computer system categorizes the document as a TECHNOTE.

If the number of steps S is higher than the sixth threshold, then the process proceeds from step 314 to step 318. Again, the computer system compares the number of words, w, of the document with the seventh threshold. If the number w is lower than the latter, then the process proceeds to a step 320 during which the computer system categorizes the document as being FIX. Conversely, the process proceeds from step 318 to step 319, during which the computer system categorizes the document as a STEPNOTE.

The values given above are only given for illustrative purposes and they can, of course, be optimized or adapted to any particular application.

The determination of the number of lines, the computing of the number of words and the consideration of the number of concept permits, in addition to the identification of the number of steps, provide a precise categorization of the whole repository of documents.

It can be seen from the developments above, that the first classification level is directed to the way the user/customer, or the help-desk staff in the case of a repository arranged for a helpdesk service, can use the documents. Such automatic categorization permits the documents to be tagged in the three distinctive, mutually exclusive, labels: FIX, STEPNOTE and TECHNOTE.

In the preferred embodiment, once the computer system completes the first classification level, the computer system executes a second classification level. Basically, the aim of the second classification is to enhance the partitioning process of the document repository, based on a class division. For this purpose, a number of K classes are defined and a subset of these classes, preferably a first class, a second class and a third class, is assigned to each document within the repository. While the number of classes which can be used for this purpose can vary to a large extent in accordance with the application concerned, the number of classes is preferably fixed at seven classes, thus providing seven relatively wide problem domains to which the help-desk analyst must refer. The rationale is that, in short term human memory, a number of seven or eight (maximum ten) classes can be easily remembered and this substantially facilitates the use of the process by first level agents of the help-desk service.

Figure 4:
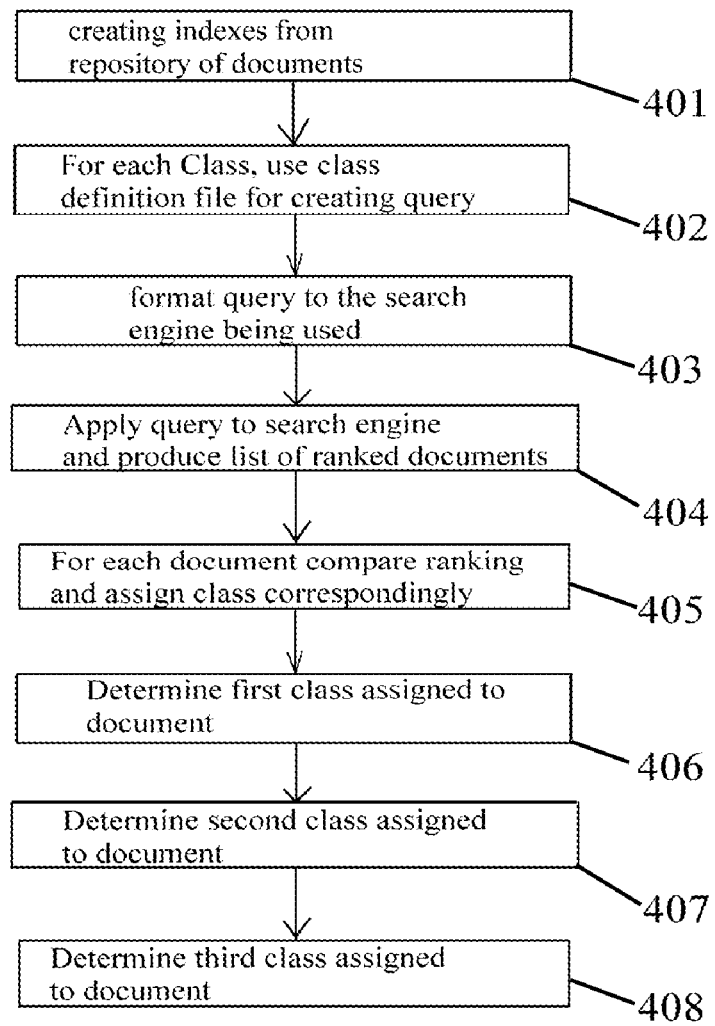
FIG. 4 is a flow chart of operations the computer system performs to obtain a second level of classification based on an automatic assignment of the problem classes to the documents.

After the computer system determines the number of classes defining the different domains to which the different documents can relate (as described with reference to FIG. 3), the computer system automatically classifies every document as described with reference to FIG. 4.

In a step 401, the computer system analyzes each document for the purpose of generating a list of indexes. The computer system includes any suitable indexing method or software program to generate the list of indexes used to describe the knowledge base. Many known techniques can be used for providing a set of indexes from a collection of documents and electronic references. Many software programs are known for providing such result and the process described here can be straightforwardly adapted to whatever particular index creating software is used.

Optionally and/or in parallel with the step 401, a list of keywords is obtained to provide a set of description words which are provided to, and inspected by, a set of human experts. These experts are asked to inspect several hundreds of help-desk documents and to extract keywords which they think are representative of the eight predefined (imposed) problem classes. For the purpose of facilitating this exercise, the computer system automatically computes a set of keywords by eliminating keywords having higher and lower frequencies in the documents. In the help-desk example in the field of computing, the following classes are used, for instance:
Install,
Boot,
Login/connect,
Print,
Usage,
Startup,
Error,
General.

Such domain or class definitions are only given for the sake of illustration. Clearly they can be adapted in accordance with the application being considered.

For each class being considered, a list of keywords is generated and stored within a file of the computer system. Each keyword is chosen in such a way so as to be representative of one aspect of the class definition. In addition, keywords extracted from the list of indexes and having extreme frequencies of occurrence are disregarded. Each domain or class is thus assigned a list of keywords which is stored within a corresponding file of the computer system. Preferably, the computer system automatically computes a set of keywords from the repository document to facilitate the definition of keywords included within each class file. The class or domain files can be TEXT files or files complying with the extended Mark-up Language (XML) standards. This set of words is used to elaborate a set of n description lists that contains lists of keywords arranged to describe each particular class being considered. If the class is dedicated to refer to "install" problems, the following list of keywords could, for instance, be predefined and then stored within a corresponding class definition file.

The following is an illustrative file for the definition of the INSTALL class:
configuration
configuration<in>title
masters
update
upgrade
upgrade<in>title
"load"
load<in>title
"loading"
"loader"
control+panel
file+manager
install <in>title
install
README.TXT
installation
reinstall
reinstall <in> title
setup
setup<in> title
uninstall <in>title After the completion of the search engine index, and when the K class definition files are available within the computer system, the computer system proceeds to step 402 during which the computer system generates for each class a query which the computer system formats in step 403, for the particular search engine being considered.

In step 404, the computer system launches the formatted query in the search engine being used and the latter produces a list of ranked documents corresponding to the particular class which is considered. * * *

The computer system performs the same process again for each of the K classes which were imposed to produce a set of K lists of ranked documents, with each list corresponding to one associated class.

In step 405, the computer system compares, for each document, the particular ranking which has been assigned to the document in each of the K lists. In step 406, the computer system determines the particular list among the K lists of outputs for which the given document has the highest rank and correspondingly assigns the class corresponding to this list as being the first class.

In step 407, the computer system determines the list having the second highest ranking and correspondingly identifies the second class assigned to this document.

In step 408, the computer system determines the third class assigned to the document by identifying the list in which said document has the third highest ranking.

The computer system preferably complements the process with statistical analysis to eliminate, for one document, a list of results in which the document has too low a ranking even though that particular ranking is the highest ranking for the document concerned. (This is illustrative of the case where a document that is ranked low for all given classes is eliminated as a consequence)

When the step 408 has been completed, the repository contains documents which have been assigned first, second and third classes without requiring a manual operation from the user. The second-level classification is thus, as was the first-level classification, completely automatic, a substantial advantage over known techniques that require manual classifying operations involving higher costs and effort. Once the K lists of keywords have been defined, the whole repository of documents can be easily classified. The classification of each additional document which is incorporated within the repository only requires the processing of K queries and the comparison steps described above.

The repository which is classified in accordance with the process defined above is easy to exploit to implement an effective information retrieval system. Since each document of the repository is precisely classified, by document category, such as categories FIX, FIXSTEP and STEP NOTE, and by problem class, such as classes "install", "boot", "login/connect", and general etc. . . . , the relevance of the documents which can be retrieved by the search engine can be improved. In particular, the first level agents of the help-desk staff can be provided with the most useful documents and references providing immediate guidance which they can in turn provide to their customers. On the other hand, the same repository of documents is also useful for experienced and skilled technicians since they can access a wide number of references, including long, technical notes. By introducing document category and problem class labels, the search space is reduced and the grouping of the documents into problem definition classes improved. Consequently, as will be seen below in the searching process described with reference to FIG. 5, if the type of help-desk agent and the problem domain are known, a contextual search process can be achieved and the results being obtained, as well as the number of relevant documents being returned to the agent, are substantially improved.

Figure 5:
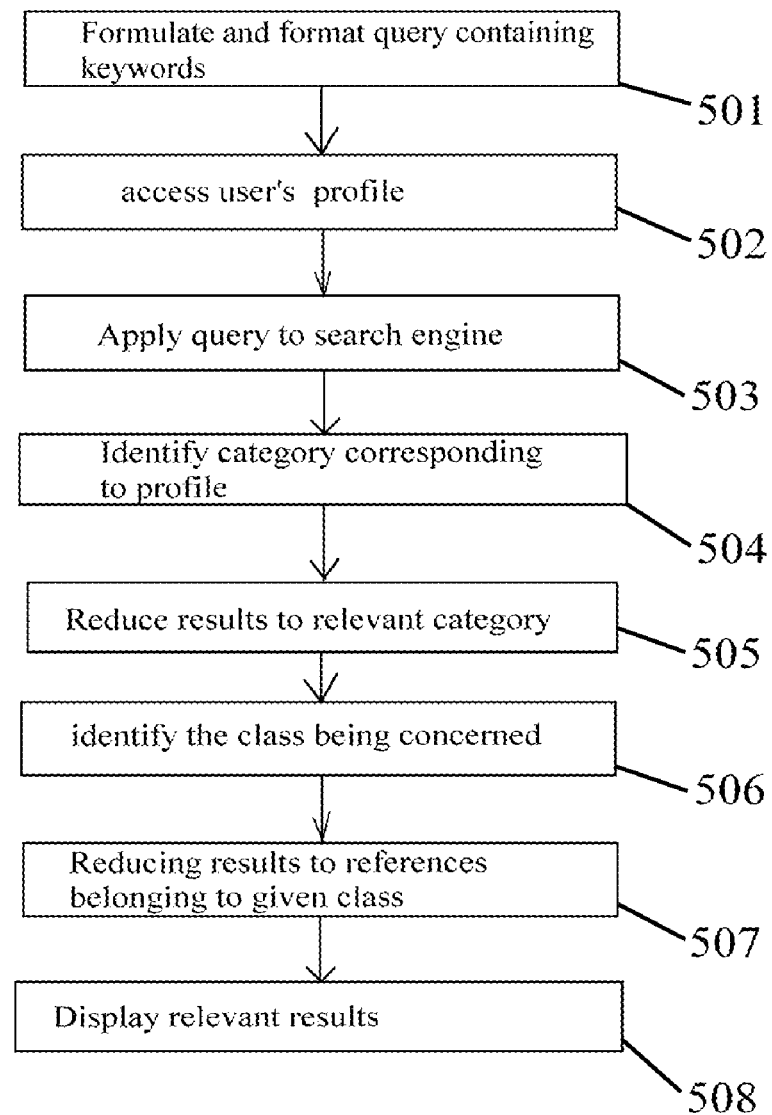
FIG. 5 is a flow chart of operations the computer system performs to obtain a contextual retrieval process of the documents and references stored within a repository.

With respect to FIG. 5 there is now described the contextual search process the computer system performs for information retrieval of a document within the repository of documents generated using the above described processes.

In step 501, a query corresponding to the particular description of the problem which the user wishes to handle is defined. The computer system then formats a query to fit the search engine.

In step 502, the computer system accesses a user profile containing information representative of the user and, particularly, specifying whether the user is a first line agent, a technician or an expert in the particular area being considered.

In step 503, the computer system applies the query to the search engine, which generates and retrieves a list of documents corresponding to the query.

In step 504, the computer system identifies the category which corresponds to the user's profile determined in step 502.

In step 505, the computer system reduces the number of documents being retrieved from the search engine to those tagged according to the particular user-category being considered. For the first line agent of a help-desk tool, for instance, since the help-desk tool has very little time to process the request, only the category FIX or STEPNOTE documents are considered.

In a step 506, the computer system identifies the particular class(es) which is or are relevant to the query being considered. The identification is preferably achieved by transmitting a request to the help-desk agent based on a selection box of a graphical user interface (GUI) of the help-desk software tool allowing quick selection. In response to the selection, the computer system reduces the list of documents further during step 507.

In step 508 the computer system then recomputes the ranking of the listed documents and the result is then displayed to the agent or the user. Because of the double-filtering of the list of references, the relevance of the results of the retrieving process is substantially improved, including first line agents to more easily retrieve documents that provide quick and immediate action to solve the particular problem facing the customer.

The process is particularly useful in application to help-desk environments where first line agents only have a few minutes to consider each question posed by the customers and to finding a practical solution for them. By reducing the output list of documents to the first category corresponding to the FIX documents, the first line agent can be assured that he is provided a short list of documents which should, in most cases, fully address the problem raised by the customer by presenting an immediate, concrete solution. Since the first line agents do not have to refer to third class category documents, they are relieved of the necessity of reading long documents. For cases where the first-line agents cannot provide an immediate solution to solve the customer's problem, the issue can be passed to second-line technicians—and even third-line experts—who normally are assigned a longer time for addressing the problem. In this case, the process permits the list of documents to be enhanced with third category documents to provide the technicians and experts more comprehensive documents concerning the particular problem being considered.

Therefore, it can be seen that the process described above is particularly well suited for the organization of help-desk services. The knowledge base is arranged and partitioned into a set of n classes which are defined with respect to the users of the repository. Documents can be continuously added to the repository through automatic analysis and processing to assign them category tags/labels and the classes. The same repository of documents can be used in a single retrieval process to provide technical references and documents for any kind of application, such as car maintenance help-desk etc. . . .

By introducing document categories and problem classes for each document in the repository, the number of returned documents can be reduced by sorting them into appropriate categories (in accordance with the profile of the user) and appropriate classes (in accordance with the problem being addressed). The relevance of the documents which the process outputs is therefore substantially improved. An additional advantage is the reduction of the costs for content management.

While the process is particularly described in relation with the organization of a help-desk arranged to provide computing support and assistance, it is clear that the teaching can be straightforwardly adapted to the arrangement of any other types of help-desk or for other purposes.

The invention claimed is:

1. Process of aiding retrieval by a search engine of a document in a repository of documents, said process comprising the steps of:
    applying to each document in the repository a first classification based on a profile of a user with access to the repository, the classification being determined by the role of the user in use of the content of the particular document that the user seeks to retrieve from the repository;
    after the classification has been applied to the documents, applying a query formulated by said user to the search engine;
    said search engine responding to the query by producing a list of references of documents in the repository;
    causing a machine to reduce said list of references by, in said machine, eliminating from said list those references which do not correspond to the user's profile.
    wherein the application of said first classification comprises counting the number of words in the document, determining whether the document contains an immediate solution to a problem in response to the counting step, and assigning a first category to said document in response to said determination.

2. Process of aiding retrieval by a search engine of a document in a repository of problem solving documents, said process comprising the steps of:
    applying to each document in the repository a first classification based on a profile of a user with access to the repository;
    applying a query formulated by said user to said search engine;
    producing a list of references of documents in the repository by said search engine in response to the query; and
    causing a machine to reduce said list of references by, in said machine, eliminating from said list those references which do not correspond to the user's profile,
    applying to each stored document a second classification which is representative of the subject matter of the stored document, reducing the number of documents in the list in accordance with said first classification and said second classification level, said second classification level being based on a definition of K predetermined classes, each class being defined by a set of n keywords;
        each document being assigned at least one class by an automatic process comprising the steps of:
        applying for each class a query based on a set of keywords extracted from a class definition file, said query being applied to the search engine;
        producing a number of K lists of results, each list corresponding to one given class;
        comparing for each document of said repository a ranking received in said K lists; and
        determining a list among said K lists in which said document receives the highest ranking; and
        correspondingly assigning the class corresponding to said particular list as the first class.

3. Process aiding retrieval of a document stored in a repository of documents, the repository being capable of being indexed by a search engine, said process comprising the step of:
    Storing in a computer system a first classification applied to each of said documents in the repository, the first classification being based on a profiled of a user who has access to the repository, the classification being determined by the role of the user in use of the content of the document that the user seeks to retrieve from the repository;
    wherein said first classification is applied to each of said documents by said computer system by: (a) counting the number of words in the document, (b) determining whether the document contains an immediate solution to a problem in response to the counting step, and (c) assigning a first category to said document in response to said determination.

4. A process of aiding retrieval, by a search engine of a document in a repository of problem solving documents, said process comprising the steps of:
    storing in a computer system a first classification applied to each of said documents in the repository, the first classification being based on a profile of a user who has access to the repository,
    applying to each document in the repository a second classification which is representative of the subject matter of the document, said second classification being based on the definition of K predetermined classes, each class, being defined by a set of n keywords, and each document being assigned at least one class by the computer system performing an automatic process comprising the steps of:
    applying for each class a query based on a set of keywords extracted from a class definition file, said query being applied to the search engine producing a number of K lists of results, each list corresponding to one given class;
    comparing for each document of said repository a particular ranking which is received in the said K lists; and
    determining a list among said K lists in which said document receives the highest ranking and correspondingly assigning the class corresponding to said particular list as the first class.

5. Process as claimed in claim 1 wherein the applying step comprises counting the number of lines contained in said documents.

6. Process as claimed in claim 1 wherein said first classification results in one of three tags being associated with the stored documents, said tags comprising:
    a first tag assigned to the stored documents describing immediate action;
    a second tag assigned to the stored documents describing a short sequence of operating steps;
    a third tag assigned to the stored documents describing background technical description.

7. Arranging a help-desk software tool to access a document repository for first level agents, technicians and experts by using the process of claim 1.

8. Process as claimed in claim 2, further including assigning each document to at least one of an optional second class and third class.

9. Process as claimed in claim 3 wherein the classification is applied by the computer system by counting the number of lines contained in said document.

10. The process of claim 3 wherein the computer system determines the number of concepts addressed by said documents in response to the comparing step.

11. Process as claimed in claim 3 wherein the first classification results in one of three tags being associated with the document, said tags comprising:
    a first tag when the document describes immediate action;
    a second tag when the document describes a short sequence of operating steps;

a third tag when the document describes a background technical description.

12. Process as claimed in claim 4 further including the computer system assigning to each document at least one of an optional second class and third class.

13. the process of claim 1 further including determining the number of concepts addressed by said stored documents in response to the comparing step.

* * * * *

UNITED STATES PATENT AND TRADEMARK OFFICE
CERTIFICATE OF CORRECTION

| | | |
|---|---|---|
| PATENT NO. | : 7,945,567 B2 | Page 1 of 1 |
| APPLICATION NO. | : 10/388601 | |
| DATED | : May 17, 2011 | |
| INVENTOR(S) | : Kemal Delic et al. | |

It is certified that error appears in the above-identified patent and that said Letters Patent is hereby corrected as shown below:

In column 11, line 19, in Claim 1, delete "profile." and insert -- profile; --, therefor.

In column 11, line 64, in Claim 3, delete "Storing" and insert -- storing --, therefor.

In column 12, line 11, in Claim 4, delete "retrieval," and insert -- retrieval --, therefor.

In column 14, line 1, in Claim 13, delete "the" and insert -- The --, therefor.

Signed and Sealed this
Eighth Day of November, 2011

David J. Kappos
*Director of the United States Patent and Trademark Office*